United States Patent [19]
Damkjær

[11] Patent Number: 5,848,958
[45] Date of Patent: Dec. 15, 1998

[54] SET OF MODULAR ELEMENTS FOR THE CONSTRUCTION OF A DRIVING PULLEY FOR A BELT CONVEYOR

[75] Inventor: Poul Erik Damkjær, Vejle Øst, Denmark

[73] Assignee: Maskinfabrikken Baeltix A/S, Vejle Øst, Denmark

[21] Appl. No.: 623,115

[22] Filed: Mar. 28, 1996

[30] Foreign Application Priority Data

Apr. 3, 1995 [DK] Denmark .................................. 0373/95

[51] Int. Cl.⁶ ...................................................... B23P 15/00
[52] U.S. Cl. ................................ 492/39; 492/15; 492/38; 492/56
[58] Field of Search ................................ 492/15, 39, 16, 492/28, 38, 56, 47

[56] References Cited

U.S. PATENT DOCUMENTS

| | | | |
|---|---|---|---|
| 4,974,782 | 12/1990 | Nelson | 492/39 |
| 5,273,512 | 12/1993 | Ducasse | 492/38 |
| 5,411,463 | 5/1995 | Brookstein | 492/39 |

FOREIGN PATENT DOCUMENTS

| | | | |
|---|---|---|---|
| 126420 | 11/1973 | Denmark | B65G 39/04 |
| 1047850 | 12/1953 | France . | |
| 2006880 | 2/1970 | Germany | B65G 39/00 |
| 808117 | 1/1959 | United Kingdom . | |
| 2014275 | 8/1979 | United Kingdom | B65G 39/02 |

*Primary Examiner*—Larry I. Schwartz
*Assistant Examiner*—Marc W. Butler
*Attorney, Agent, or Firm*—Antonelli, Terry, Stout & Kraus, LLP

[57] ABSTRACT

A set of modular elements for the construction of a driving pulley (1) for belt conveyors or the like comprises a steel shaft (3), at least one disk element (2) of synthetic material and at least two end pieces (8), similarly of synthetic material, plus a number of bolts (11) with nuts (12) arranged for the tightening together of the end pieces around the disk element(s) in such a manner that the shaft is secured in the pulley.

In the area for the disk elements (2), the shaft (3) is hexagonal in shape (5) and each disk element has a corresponding axial opening, and the shaft comprises an axial bearing journal (6) at each end and a trunnion (7) for at least one drive wheel (16).

The driving pulley is preferably coated with a rubber or rubber-like lagging (4).

15 Claims, 4 Drawing Sheets

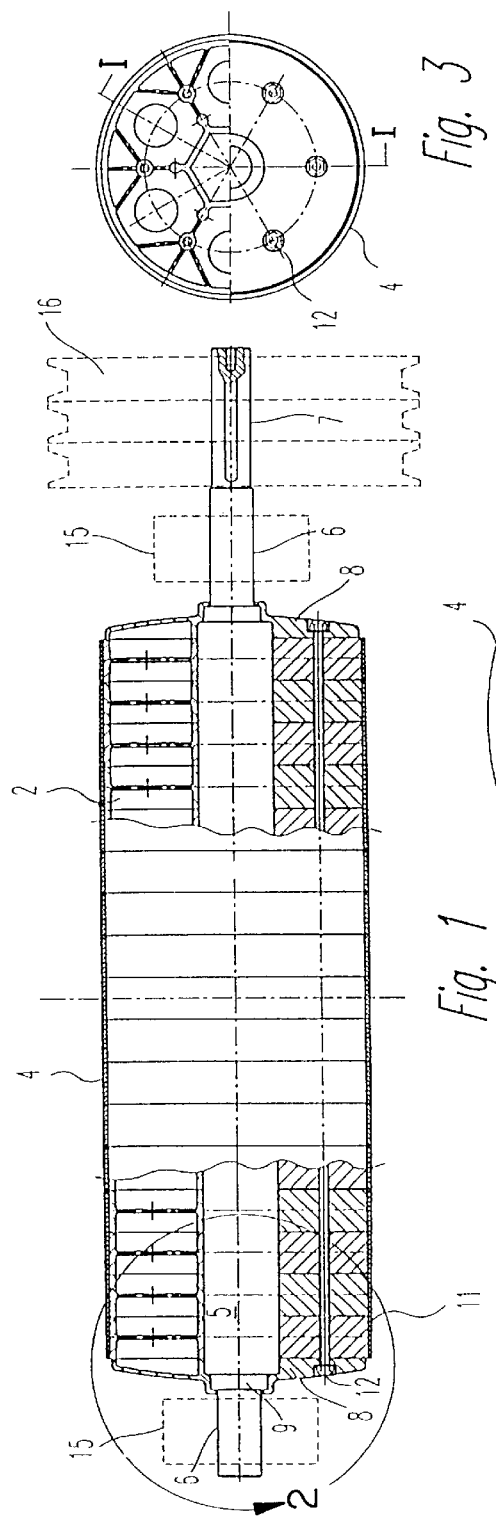

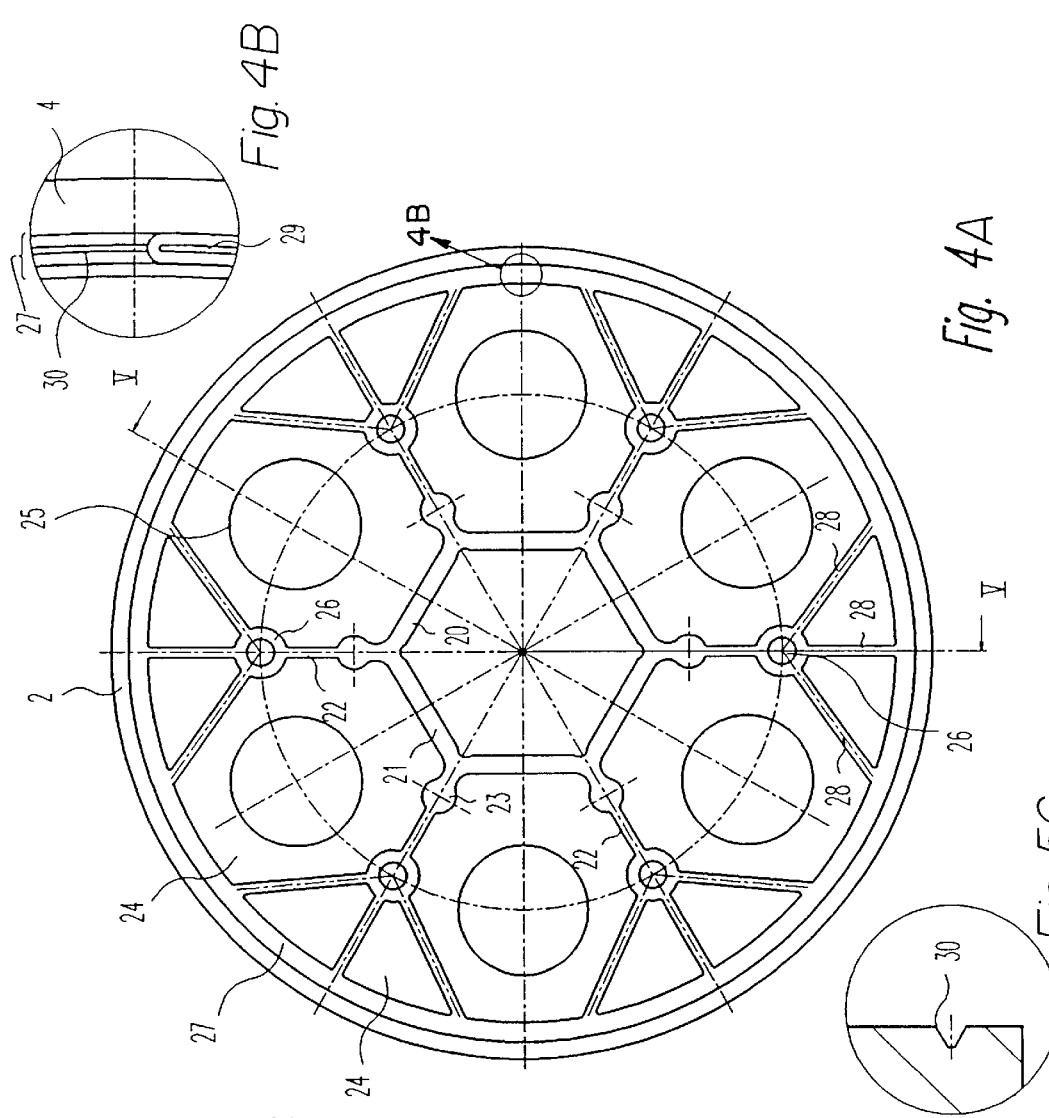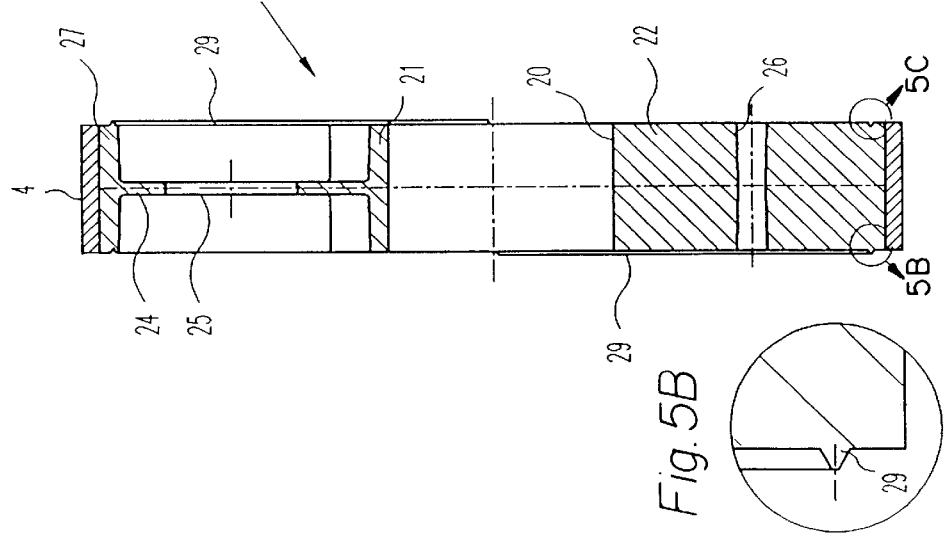

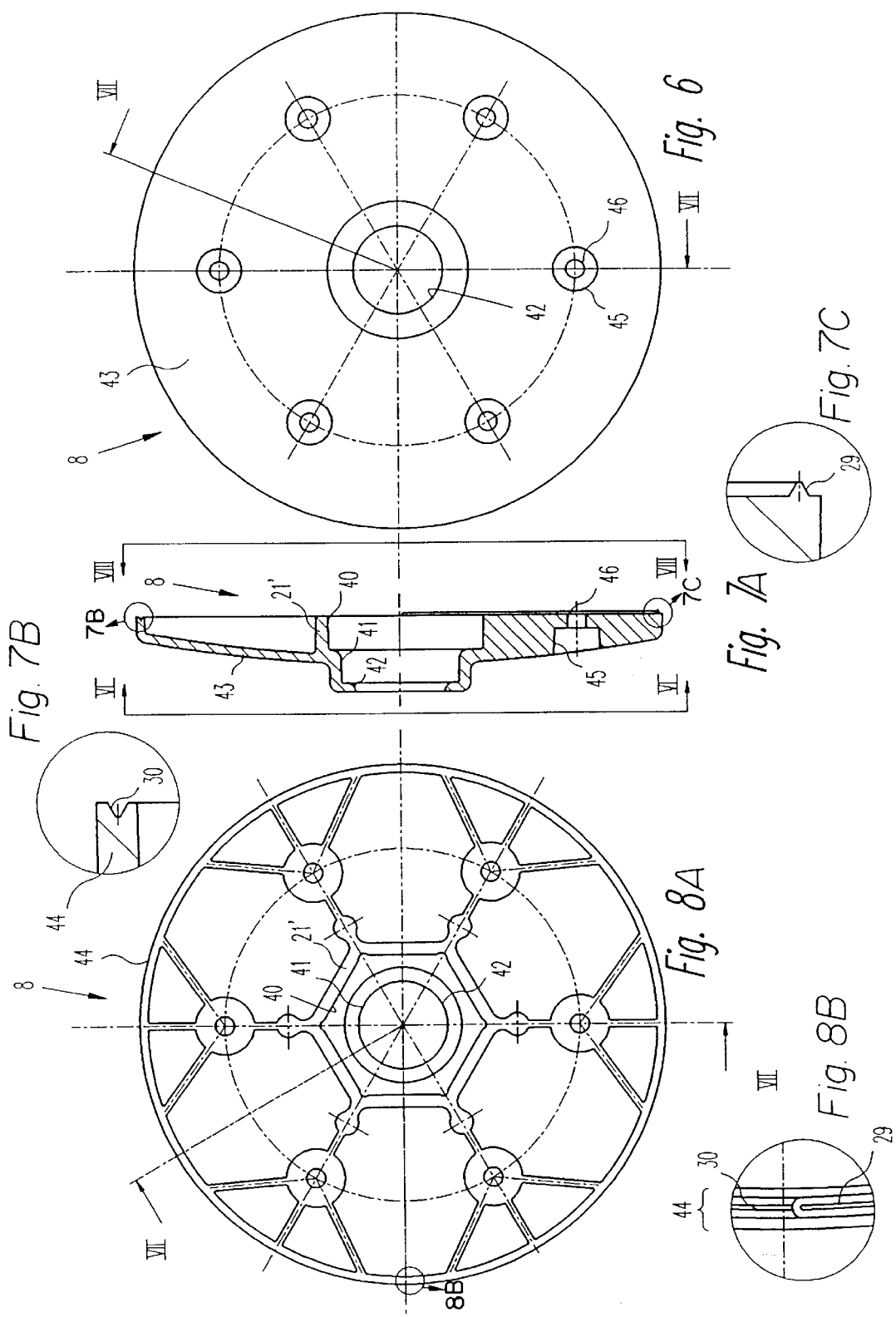

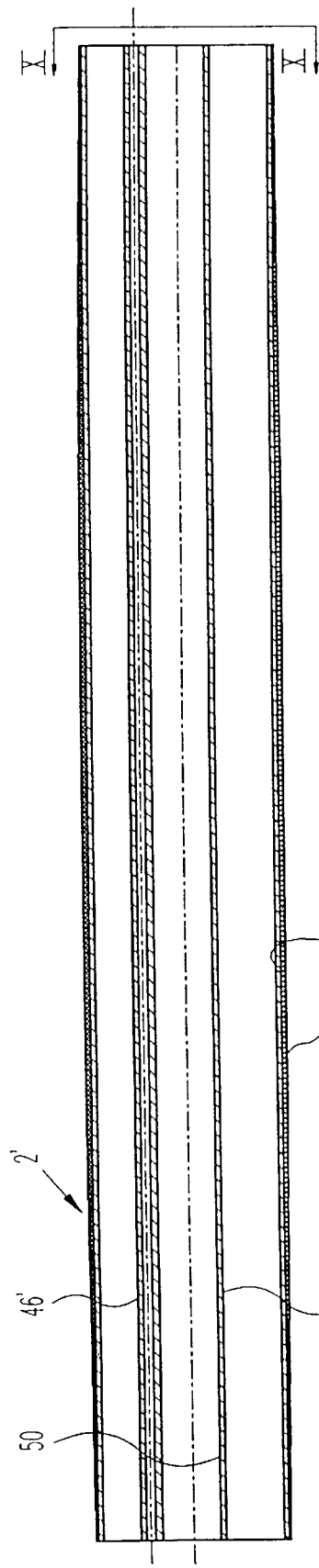
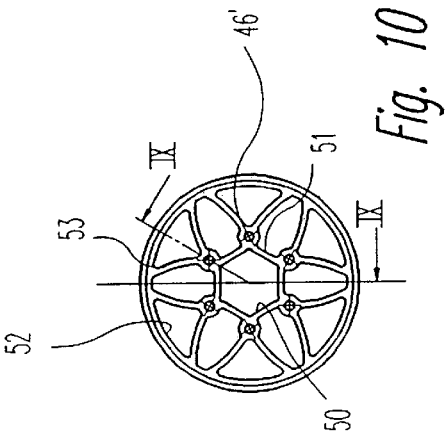
Fig. 9
Fig. 10

SET OF MODULAR ELEMENTS FOR THE CONSTRUCTION OF A DRIVING PULLEY FOR A BELT CONVEYOR

BACKGROUND OF THE INVENTION

1. Field of the Invention

The invention relates to a set of modular elements for the construction of a drive pulley for a belt conveyor or the like, i.e. belt conveyors of the kind where an endless, flexible belt, e.g. of rubber, rubber-like material or composed of a number of plastic modules, is fed around drive pulleys, and where that part of the belt which supports the goods is provided at suitable intervals with a number of supports, usually in the form of support frames with idler rollers.

2. Description of the Prior Art

Conveyor tracks of this kind are used for the transport of goods packed in sacks, parcels and the like, and for the transport of so-called heavy goods, e.g. gravel, coal, grain etc. which are not packed. Such conveyors are frequently used outdoors, so that they are exposed to climatic conditions, and the materials which are conveyed can be of such a nature that water, other liquids, dust, sand etc. can influence the pulleys and the bearings on which they are supported. Pulleys for this purpose must therefore be particularly robust and, moreover, be arranged to be able to function for the duration of their lifetime without any great degree of maintenance.

Drive pulleys must be designed for heavy loads and in such a manner that the necessary tractive power can be transferred from the respective driving motor, usually a geared motor, for the driving of the external surface of the drive pulley.

Consequently, drive pulleys for conveyor belts are as a rule produced as solid steel constructions, in that a steel shell is assembled around a shaft by means of end pieces of steel which block-off internal ball bearings, or where for drive purposes the steel shell is coupled firmly to the shaft via radial parts. In order to obtain a sufficiently precise pulley, it is normal practice for the outer side of the shell to be turned on a lathe when the end pieces etc. are mounted, which unfortunately considerably increases the costs, increases the production time and, moreover, requires the availability of a relatively large lathe in order to be able to carry out the turning of the outer side. The known steel pulleys are usually produced to order, which gives rise to long delivery times, the result being that a conveyor can stand idle for long periods of time. The known pulleys are delivered with or without a rubber or rubber-like lagging. The rubber lagging is used mainly to increase the friction between the drive pulley and the conveyor belt. In order to be able to fasten a rubber lagging on a steel pulley, the surface must be made rough, which e.g. can be effected by sandblasting, and the subsequent vulcanizing of the rubber on the pulley. This is a very expensive process, the result being that extensive efforts are made to operate without lagging.

Furthermore, idler rollers for conveyor belts or roller tracks are known to be produced of a number of cylindrical, disk-shaped plastic elements which are mounted on a common shaft by means of axially-extending bolts through the elements, see e.g. Danish Patent No. 126.420. The elements clamped together are closed at each end by a cover plate in order to prevent dirt, water etc. gaining ingress to the bearings, which are disposed internally in the central, axial cavity which is formed by the elements clamped together. However, this configuration does not have sufficient strength to be able to function as a driving pulley for a belt conveyor, among other things because the individual elements are not supported by the shaft but merely clamped together in the axial direction. The great load which arises at the ends of a belt conveyor, precisely at that point where the driving pulley or the carrier pulley is placed, will result in an unacceptable bending outwards. Moreover, it will be very difficult to couple the driving power to such a construction if an attempt is made to produce a drive pulley with this configuration.

From British Patent No. 808.177 there is known an idler roller produced from a steel shell with rubber lagging and for belt conveyors and the like. The steel shell has end pieces which close off the internal bearings. This construction is not suitable for use as a drive pulley.

From French Patent No. 1,047,850 there are known idler rollers for belt conveyors where a number of identical disk elements can be mounted on a shaft to achieve an idler roller of the desired breadth. The disk elements can be made of synthetic materials or metal. The disk elements are assembled by through-going bolts to a drum which can rotate on the shaft, e.g. lubricated from a supply of lubricant existing inside the drum. This construction is not suitable for use as a drive pulley.

Finally, it is known from British Patent No. 2.014.275 to use a shaft with square cross-section for rollers, e.g. for roller tables in steel mills and the like, in order to achieve firm engagement between the shaft and the flange parts which support the steel shell which constitutes the roller.

SUMMARY OF THE INVENTION

By configuring a set of moduler elements according to the invention, the drive pulley thus achieved is strong, solid and very reliable in operation and can be produced at considerably lower costs than the known pulleys, e.g. by using the commonly-known injection moulding technique for the production of the plastic parts and possible rubber parts. At the same time, the resulting configuration makes it possible to hold a stock of a few parts which can quickly be assembled to produce a drive pulley of a desired size, and without the need for special tools. The possibility is hereby provided of relieving the delivery-time problem with the known drive pulleys.

With disk elements and end pieces of one size, it is possible to produce pulleys of many different breadths, and for which all that is required are shafts of different lengths. In practice, the shaft is not produced until the order for a pulley has been received, in that the pulley producer merely holds a stock of bar steel with the correct cross-sectional profile which, when the order is received, is cut off in suitable lengths, after which the bearing journals and possible trunnions are turned in an ordinary lathe which is to be found in any machine shop. The modular elements according to the invention thus considerably reduce the amount of stock and herewith the stock-keeping costs and, what is even more important, the delivery time is considerably reduced.

The clamping together of the elements for a pulley can be effected by standard bolts or standard stay-bolts or threaded rods which are cut off according to requirements.

With the solid, polygonal steel shafts and the tightened-together plastic parts, the drive pulley can transfer the forces necessary for the driving of even very long conveyor belts, without any consequent bending-out of the shaft or deformation of the specially-configured plastic parts.

The end covers hold the shaft in place in the bolted-together elements, and moreover provide adequate sealing against dirt, sand etc.

The strength achieved with relatively low material consumption is sufficient for even very heavily loaded conveyors, which contributes towards a reduction in the weight of the finished pulley without any decrease in strength.

The set of modular elements according to the invention is preferably configured to have the necessary strength characteristics and the solid engagement necessary between the shaft and the disk elements. It is naturally also an advantage that bar steel with this cross-sectional profile and with those dimensions which are required can be bought as a finished product.

It is possible in a simple manner to produce drive pulleys in those cases where it is required or desirable for them to have a rubber lagging. The rubber lagging can thus be applied in the production of the individual disk elements, which e.g. can be effected by an injection moulding in two steps, the first being the moulding of the rubber lagging and the second the placing of this in the plastic injection mould and the moulding of the plastic part, e.g. of reinforced nylon. Since the nylon has a higher melting temperature than rubber, the nylon part will melt together with the rubber part and a firm vulcanizing of the rubber part is achieved automatically. The rubber lagging which is achieved in this manner sits immovable on each individual disk element.

With the set of modular elements according to the invention, pulleys can be produced where the drum including the shaft constitute a unit which is moved in unison, and where each end of the shaft is provided with a bearing journal. The bearings are disposed outside the drive pulley, so that all commonly-known bearing constructions can be used. At one of the ends the shaft is extended with a trunnion, e.g. with tongue-and-groove for drive wheels, e.g. gear wheels, chain wheels, belt wheels or the like. The possibility is hereby achieved for a very high degree of power transfer from a drive motor to a drive pulley, and such that all disk elements are in active engagement with the shaft and can not be moved in relation to one another or in relation to the shaft. This applies also to the end pieces. The drive pulley achieved hereby is one with optimum of strength characteristics.

A safeguard is provided against projecting parts from the assembly bolts, so that the drive pulley, also at the end pieces, has a smooth surface and is without projections.

A very rigid construction is achieved, in that the edges of the disk elements which face towards one another rest against each other, clamped together by the assembly bolts so that the assembled pulley constitutes a very strong and stable construction.

To further increase the strength in the radial direction, a support wall. This support wall also supports the remaining support walls, so that a lattice-work is formed inside the pulley. A very strong and rigid construction is hereby achieved with a modest amount of materials.

The set of modular elements according to the invention can be configured to provide a certain engagement between adjacent outer edges, which increases the tightening and the engagement between the individual disk elements and between the outermost disk elements and the end piece at each side.

Finally, the set of modular elements according to the invention can be configured to provide a drive pulley having maximum strength characteristics is achieved.

BRIEF DESCRIPTION OF THE DRAWINGS

The invention will now be described in more detail with reference to the drawing, in that FIG. 1 shows a drive pulley according to the invention partly in section and according to a first embodiment, FIG. 2 shows a section of FIG. 1 but on a larger scale, FIG. 3 shows the pulley in FIG. 1 seen from the one end, FIG. 4 shows a disk for the driving pulley in FIG. 1 seen in the axial direction and with a detail on a larger scale, FIG. 5 shows a section V—V in FIG. 4 with details on a larger scale, FIG. 6 shows an end piece for the driving pulley in FIG. 1 seen in the axial direction, i.e. in the direction VI—VI in FIG. 7, FIG. 7 shows a section VII—VII in FIGS. 6 and 8 and with details shown on a larger scale, FIG. 8 shows the end piece in FIG. 6 seen axially but in the opposite direction, i.e. in the direction VIII—VIII in FIG. 7, with detail on a larger scale, FIG. 9 shows a disk element for a driving pulley according to the invention according to a second embodiment and shown in section, i.e. a section IX—IX in FIG. 10, and FIG. 10, shows the disk element in FIG. 9 seen in the axial direction X—X in FIG. 9.

DESCRIPTION OF THE PREFERRED EMBODIMENTS

A driving pulley with the set of modular elements according to the invention, comprises at least one shaft, at least one disk element and at least two end pieces and a number of assembly bolts, preferably six bolts. If the shaft is a finished product, the parts can be assembled in a moment, and if a shaft of the required length is not in stock, it can be produced in a few hours on an ordinary lathe.

The description of the invention first describes the pulley as a whole and the configuration of the shaft with reference to FIGS. 1–3. This is followed by a description of the disk elements according to a first embodiment with reference to FIGS. 4–5, and hereafter a description of the end pieces with reference to FIGS. 6–8. Finally, a disk element according to a second embodiment is described with reference to FIGS. 9–10.

A complete pulley 1 is shown in FIGS. 1–3. This comprises a steel part in the form of a shaft 3 which has a hexagonal area 5 where the plastic disk elements 2 and the plastic end pieces 8 are disposed, and the shaft is provided at each end with a bearing journal 6 and at one end with a trunnion 7 with tongue-and-groove or similar means for the fastening of a drive wheel, e.g. a gear wheel, a chain wheel, a belt wheel or the like.

A sketch is shown of a bearing housing 15 at each side of the shaft and a multi-V-belt wheel 16 on the trunnion 7.

Furthermore, between the hexagonal part 5 and the bearing journals 6 at each side there is a turned collar 9 with a slightly greater diameter than the journal, so that a shoulder 10 is formed between these parts for abutment against the end pieces 8 as shown in FIG. 2. A further shoulder 13 is provided between the collars 9 and the bearing journals 6 for tightening between the bearing journals and the inside of the pulley.

The end pieces 8 thus serve several functions. They conclude and close-off the disk elements outwardly, they provide a good, smooth termination of the pulley ends, they hold all of the parts together by means of the threaded rods 11 or bolts 12, and they hold the shaft in place in the pulley.

The shaft 3 is normally produced from standard, hexagonal, solid steel rods which are cut off at a suitable length depending on the desired breadth of the pulley, after which the ends are turned on an ordinary lathe and the shaft is ready for use.

To increase the friction, driving pulleys are often desired to have a lagging 4 of rubber or rubber-like material which covers all of the disk elements 2, and which is possibly configured so that the lagging is thickest in the middle. The friction lagging 4 can be configured either as an individual coating on each individual disk element, the lagging being applied during the production of the disk element and as shown in FIG. 5, or it can be in the form of a common all-in-one lagging which is applied after final assembly of the pulley.

The assembly bolts 12 can be stay-bolts, long bolts or threaded rods 11 which, by means of the nuts 12, clamp the end pieces 8 firmly around the disk elements 2.

In FIG. 2 it is shown that the bearing journal has a diameter D, e.g. 50 mm, and that the polygonal, preferably hexagonal area 5 has a diameter A, e.g. 85 mm, so that the plastic parts can be mounted with a tight fit between the hexagonal part 5 and the corresponding hexagonal hub parts 21 of the disk elements 2, which are described later. The disk elements 2 have a diameter T of e.g. 300 mm. In order to achieve the desired strength characteristics, and herewith rigidity in the driving pulley, the diameter T is 2.5–4.5 times the shaft diameter A, and to achieve sufficient strength and transfer of power, the extent L of the disk elements 2 in the axial direction is of the same magnitude as D or A, i.e. approx. 50 mm.

The disk elements 2 in FIGS. 4–5 comprise two concentric, tubular parts, i.e. a hexagonal hub part 21 with an internal, through-going hexagonal hole 20, and a circular edge part 27, in that the edge part is secured to the hexagonal part by means of radial ribs 22 which extend to form other radial or radial-like ribs 28. As shown, the ribs 22, 28 are preferably flat, plane parts which extend from side to side and which are supported by a plane, central disk-shaped support part 24. The rib parts 28 have thickened portions 23 which, in the shown embodiment, are areas for ejectors in an injection mould, and thickened areas 26 further away from the center with through-going openings for the assembly bolts 11. All of the parts 21, 22, 23, 24, 26, 27, 28 are moulded as a single unit by injection moulding in an injection mould, preferably of reinforced plastic, e.g. glass-reinforced nylon, or of another material with sufficient strength and suitable characteristics.

It is possible for the support parts to be provided with openings 25, e.g. in the support part 24, for the reduction of weight and a reduction in the amount of material etc., which can normally be effected without any significant reduction in strength.

Finally, it will be seen that the side of the disk element can have a tongue 29 extending half-way around the disk, and a similarly extending groove 30 in each side, so that adjacent disks are in engagement with each other.

The hexagonal hole in the disk elements is configured with such dimensions that it matches the hexagonal part on the shaft with a relatively good fit, i.e. so that the disk elements can be mounted firmly on the shaft.

The disk element in FIGS. 4–5 is shown with a surrounding rubber lagging 4 and is thus intended to form part of a drive pulley. The rubber lagging 4 can be applied in a subsequent injection moulding stage before the part leaves the mould.

Where their insides are concerned, the end pieces in FIGS. 6–8 are configured substantially with ribs and the hexagonal, central part 21' with hexagonal hole 40 corresponding to the disk elements in FIGS. 4–5. In a manner corresponding to that of the disk elements, the edge part 44 is configured with a half-way extending tongue 29 and groove 30, so that it can enter into engagement with the outermost disk element. In addition, it will be seen in FIG. 7 how the holes 45, 46 for bolt and nut are configured, in that these holes are provided with a depth which is sufficient to allow both the thread-piece and nut etc. to always lie below the outer surface of the cover part 43, hereby avoiding projecting parts which can get caught up in other parts.

Moreover, it will be seen more clearly in FIG. 7 how the central opening consists of a hexagonal opening 40, a round opening 41 of smaller diameter and a round opening 42 with an even smaller diameter for engagement with the shaft as shown and explained in connection with FIGS. 1–3.

FIGS. 9–10 show an embodiment of the disk element 2' which is intended for smaller drive pulleys, i.e. drive pulleys with a breadth which is small enough to enable one, broad disk element 2' to be sufficient. The extent of the disk element is small enough to enable it to be injection moulded as a single unit, or produced by extrusion so that it is sufficient with one disk element 2' and two end pieces plus a shaft for the production of a smaller drive pulley. Since smaller drive pulleys normally have smaller diameters, it is sufficient to have a hexagonal hub part 51 with a hexagonal hole 50 corresponding to the shaft, and ribs 53 as shown as one part integral with the annular edge part 52. Drive pulleys of this kind can also be produced with or without rubber lagging. In FIGS. 9–10 is shown a drive pulley with rubber lagging 4' configured with the greatest thickness at the centre of the pulley.

Furthermore, the parts shown in FIGS. 6–10 of the drawing can be made of the same material as that used in connection with the production of the disk element shown in FIGS. 4–5.

EXAMPLE

For many practical applications, the drive pulley shown in FIGS. 1–8 can have the following dimensions:

Total breadth of drive pulley: 850 mm

Maximum diameter of drive pulley: 313 mm

Breadth of each disk element: 50 mm

Number of disk elements: 17

Total length of shaft: 1335 mm

Axle journal at left-hand side: 100 mm

Axle journal at right-hand side: 135 mm

Diameter of axle journal: 50 mm

Hexagonal part of shaft; distance between parallel sides: 80 mm

I claim:

1. A set of modular elements for the construction of a driving pulley comprising:

a metallic shaft having two ends at which are located an axial bearing journal and a coupling located at at least one of the two ends for attachment to at least one drive wheel which transfers driving power from the drive wheel to the driving pulley, at least one disk element and at least two end pieces each of a synthetic material and on the metallic shaft, a plurality of connectors for clamping the end pieces together around the at least one disk element, each disk element having a central axial polygonal opening which engages the metallic shaft which has a polygonal cross section corresponding to the polygonal opening, and a ratio between diameter of the metallic shaft and an outer diameter of the pulley is such that the outer diameter is between 2.5 and 4.5 times the diameter of the shaft.

2. A set of modular elements according to claim 1 wherein each end piece has an axial central opening which comprises both a polygonal part having the polygonal opening and a circular part with a circular cross section with a transition between the parts being arranged to abut against a shoulder at an end of the polygonal cross section on the metallic shaft.

3. A set of modular elements according to claim 2, wherein the polygonal opening and the polygonal cross section is an equilateral hexagon.

4. A set of modular elements according to claim 2, wherein each end piece has a dish-shaped configuration, and on a side of each piece which is arranged to face outwards are located a plurality of recesses which receive ends of the plurality of connectors, the recesses being of a depth sufficient that after a connector is tightened, ends of the connector is positioned below an outer surface of the end pieces.

5. A set of modular elements according to claim 2, wherein each disk element comprises two concentric, tubular parts, between which are provided supporting walls with the supporting walls comprising axial channels for receiving the connectors and which are a single molded unit.

6. A set of modular elements in accordance with claim 5 wherein the two tubular concentric parts are a polygonal hub and a circular edge.

7. A set of modular elements according to claim 6 wherein an outside of the circular edge part comprises a vulcanized rubber lagging.

8. A set of modular elements according to claim 6 wherein the hub part, the edge part and axial channels for the connectors extend for substantially an equal distance in an axial direction.

9. A set of modular elements according to claim 8 further comprising a dish-shaped support wall disposed between the hub part and the edge part.

10. A set of modular elements according to claim 9 wherein the dish-shaped support wall is centrally disposed between the hub part and the edge part and is substantially in a plane at right angles to a longitudinal axis of the metallic shaft.

11. A set of modular elements according to claim 6 wherein the edge part is configured in the axial direction with cooperating tongue-and-groove arrangements, and the end pieces have an outer edge with corresponding tongue-and-groove arrangements.

12. A set of modular elements according to claim 5, wherein the polygonal opening and the polygonal cross section is an equilateral hexagon.

13. A set of modular elements according to claim 1, wherein the polygonal opening and the polygonal cross section is an equilateral hexagon.

14. A set of modular elements according to claim 1, wherein a ratio between a diameter of the metallic shaft and an outer diameter of the pulley is between 3 and 4 times the diameter of the metallic shaft.

15. A set of modular elements according to claim 1 wherein each axle bearing journal has a maximum diameter corresponding to a smallest diameter of the polygonal opening of each dish element.

* * * * *